E. W. WHITMORE.
HOSE COUPLING.
APPLICATION FILED JULY 25, 1906.
916,076.  Patented Mar. 23, 1909.
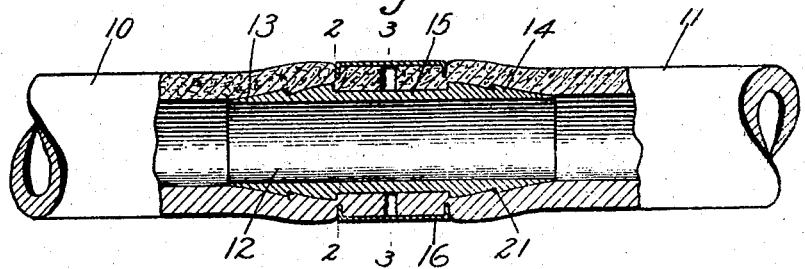
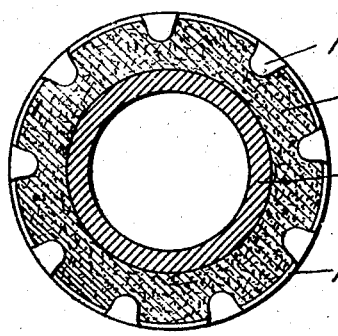
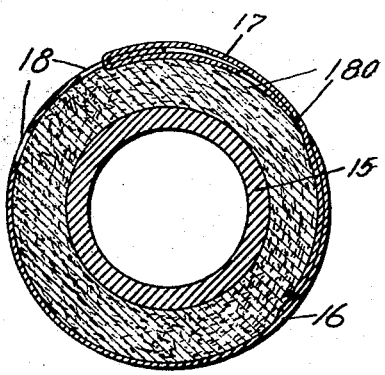
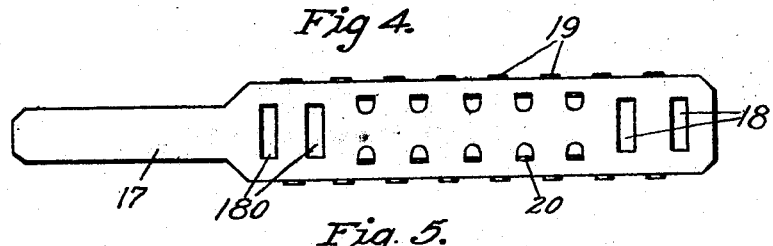
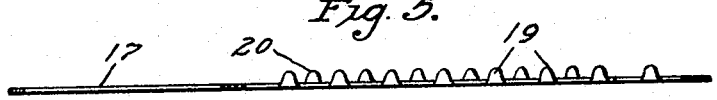
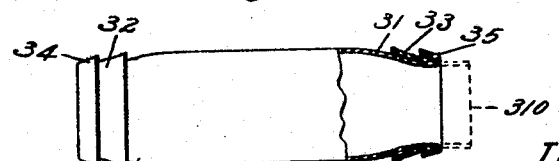
Witnesses:
Will Luther Clough
Robert Brooks
Inventor,
Erwin W. Whitmore,
By Frank G. Hattie,
Att'y.

UNITED STATES PATENT OFFICE.

ERWIN W. WHITMORE, OF LYNN, MASSACHUSETTS.

HOSE-COUPLING.

No. 916,076.  Specification of Letters Patent.  Patented March 23, 1909.

Application filed July 25, 1906. Serial No. 327,759.

*To all whom it may concern:*

Be it known that I, ERWIN W. WHITMORE, of Lynn, in the county of Essex, State of Massachusetts, have invented certain new and useful Improvements in Hose-Couplings or Joining Devices; and I declare the following to be a full, clear, and exact description of the same, such as will enable those skilled in the art to which it appertains to make and use the invention.

This invention relates to a hose-coupling, or joining-device, consisting broadly of an internal joining-member, and an external clamping-member, adapted to be operated by suitable means, whereby a water-tight joint is obtained.

The object of this device is to provide a simple, inexpensive and positive coupling or joining-device.

The further object of this invention is to provide an internal joining-member of a form easily inserted, but difficult to withdraw.

Referring to the drawings, and in detail, Figure 1 is an elevation, illustrating the relative positions of the various members. Fig. 2 is an enlarged cross-section, on the line 2—2, Fig. 1. Fig. 3 is an enlarged section, taken on the line 3—3, Fig. 1. Fig. 4 is a plan view of the clamping-member. Fig. 5 is a side view, in elevation, of said clamping member. Fig. 6 illustrates an alternative construction of the joining-member.

Referring to Fig. 1, 10 and 11 are the joined hose-members, meeting approximately at the center of the joining-member or thimble 12. This is preferably symmetrical in form, with tapered ends 13 and 14, adapted to readily enter the hose-members 10 and 11. It is further provided with annular saw-teeth, which offer no resistance to the entrance of the thimble, but render its withdrawal practically impossible. The central portion 15 of the thimble is of a decreased diameter, providing thereby a shoulder, against which the hose-members 10 and 11 are securely clamped by means of the external clamping-member 16. Referring to Figs. 4 and 5, said member 16, is extended at one extremity into a tongue 17, adapted to coöperate with slots 18. It is provided with projections 19, adapted to bite into the hose-members 10 and 11. I do not confine myself to any particular location of these projections, as they may be in exterior lines as the projections 19, or interior lines as shown at 20.

In operation, the thimble is inserted equally, as far as possible, into the two hose-members 10 and 11, and the clamping-member 16, placed around. A suitable tightener is next placed in position. The ends of the hose-members 10 and 11 are thereby depressed into the central portion 15 of the thimble. The tongue 17, is then passed through one of the coöperating slots 18, reflexed back upon itself, and locked by being passed through the locking slots 180. The teeth 19 are finally embedded in the hose-members 10 and 11, and, coöperating with the annular saw-teeth 21, render it impossible for the hose-members 10 and 11 to be separated, and at the same time, by the powerful sphincter-grip obtained, an absolutely water-tight joint is secured, easily made, and at a minimum cost.

Referring to Fig. 9, this shows a thimble of sheet-metal, as an alternative construction, to take the place of the thimble 12. The ends 30 and 31 are tapered as in the dotted position 310, and the taper collars 32 and 33 placed in position. The ends 30 and 31 are then spun into the positions 34 and 35, thereby rendering the construction integral. This method provides an easy, and inexpensive construction of a metal thimble, whenever the use of such is desirable.

In accordance with the provisions of the patent statutes, I have described the principle of operation of my invention, together with the apparatus which I now consider to represent the best embodiment thereof, but I desire to have it understood that the apparatus shown is only illustrative, and that my invention can be carried out by other means.

What I claim as new, and desire to secure by Letters Patent of the United States, is—

1. In combination with two lengths of a flexible hose, a coupling, comprising a thimble, symmetrically inserted therein, a metallic binding-strip adapted to register therewith, said strip being extended at one extremity into a tongue, and provided at the other extremity with slotted means with which said tongue is adapted to coöperate with a slotted locking means located at the base of said tongue, into which said tongue is inserted after being reflexed.

2. In combination with two lengths of flexible hose, a coupling, comprising a thimble, symmetrically inserted therein, a metallic binding-strip, provided with internal radial projections for the purpose of increasing the stability of the union of the two hose lengths, and extended at one extremity into a tongue and provided at the other extremity with slotted means with which said tongue is adapted to coöperate, and slotted means located at the base of said tongue into which said tongue is inserted after being reflexed.

3. In combination with two lengths of flexible hose, a coupling, comprising a thimble, symmetrically inserted therein, a metallic binding-strip, provided with internal radial projections for the purpose of increasing the stability of the union of the two hose lengths, and extended at one extremity into a tongue, and provided at the other extremity with slotted means with which said tongue is adapted to coöperate with a slotted locking means located at the base of said tongue into which said tongue is inserted after being reflexed.

4. In combination with two lengths of flexible hose, a coupling, comprising a thimble having a central portion of reduced diameter, a metallic binding-strip provided with internal radial projections adapted to coöperate with said reduced diameter for the purpose of increasing the stability of the union of the two hose lengths, and extended at one extremity into a tongue, and provided at the other extremity with a slotted means with which said tongue is adapted to coöperate with a slotted locking means located at the base of said tongue, into which said tongue is inserted after being reflexed.

5. In combination with a flexible hose, a coupling, comprising a thimble provided with a plurality of annular saw-teeth at both ends, said ends being tapered, a collar adapted to form annular saw-teeth, placed thereon, the outer extremities of said ends being reflexed back on said collar, thereby forming a plurality of annular saw-teeth, and securing said collar or collars in position, a metal strip adapted to register with said thimble, said strip being provided with a plurality of teeth adapted to bite into the hose, said strip having a tongue adapted to coöperate with slots in said strip, to be reflexed back on itself, and to coöperate with locking-slots in said strip, for the purpose of making a water-tight joint.

In testimony whereof I have hereunto signed my name to this specification, in the presence of two witnesses.

ERWIN W. WHITMORE.

Witnesses:
WILLIAM J. BALDWIN,
DUGALD McK. McKILLOP.